US011377060B2

(12) United States Patent
Bussels et al.

(10) Patent No.: US 11,377,060 B2
(45) Date of Patent: Jul. 5, 2022

(54) FLEXIBLE MOLDED SKIN (71) Applicants: MCPP INNOVATION LLC, Tokyo (JP); MCPP BELGIUM BVBA, Hasselt (BE)

(72) Inventors: Raf Bussels, Hasselt (BE); Ben Bouwman, Hasselt (BE); Benny Trekels, Hasselt (BE); Stefan Bemelmans, Hasselt (BE)

(73) Assignees: MCPP INNOVATION LLC, Tokyo (JP); MCPP BELGIUM BVBA, Hasselt (BE)

( * ) Notice: Subject to any disclaimer, the term of this patent is extended or adjusted under 35 U.S.C. 154(b) by 0 days.

(21) Appl. No.: 16/803,379

(22) Filed: Feb. 27, 2020

(65) Prior Publication Data

US 2020/0198569 A1    Jun. 25, 2020

Related U.S. Application Data (60) Division of application No. 15/919,610, filed on Mar. 13, 2018, now Pat. No. 10,640,071, which is a (Continued)

(30) Foreign Application Priority Data

Sep. 14, 2015    (EP) .................... 15185072

(51) Int. Cl.
| B60R 21/2165 | (2011.01) |
| B29C 41/18 | (2006.01) |
| C08K 7/16 | (2006.01) |
| C08J 9/32 | (2006.01) |
| C08K 5/11 | (2006.01) |
| C08K 3/30 | (2006.01) |
| C08J 5/18 | (2006.01) |
| C08K 3/34 | (2006.01) |
| C08J 9/04 | (2006.01) |
| C08K 3/26 | (2006.01) |
| C08K 5/12 | (2006.01) |
| C08J 9/00 | (2006.01) |
| C08K 5/00 | (2006.01) |
| B29C 41/00 | (2006.01) |
| B32B 3/26 | (2006.01) |
| B32B 5/18 | (2006.01) |
| B32B 27/06 | (2006.01) |
| B32B 27/20 | (2006.01) |
| B32B 27/30 | (2006.01) |

(Continued)

(52) U.S. Cl.
CPC ........ B60R 21/2165 (2013.01); B29C 41/003 (2013.01); B29C 41/18 (2013.01); B32B 3/266 (2013.01); B32B 5/18 (2013.01); B32B 27/065 (2013.01); B32B 27/20 (2013.01); B32B 27/304 (2013.01); B32B 27/40 (2013.01); C08J 5/18 (2013.01); C08J 9/0066 (2013.01); C08J 9/04 (2013.01); C08J 9/32 (2013.01); C08K 3/26 (2013.01); C08K 3/30 (2013.01); C08K 3/34 (2013.01); C08K 3/346 (2013.01); C08K 5/0016 (2013.01); C08K 5/11 (2013.01); C08K 5/12 (2013.01); C08K 7/16 (2013.01); B29K 2027/06 (2013.01); B29K 2105/16 (2013.01); B29K 2509/00 (2013.01); B29L 2031/3005 (2013.01); B29L 2031/3038 (2013.01); B29L 2031/3041 (2013.01); B32B 2264/10 (2013.01); B32B 2264/203 (2020.08); B32B 2605/003 (2013.01); C08J 2327/06 (2013.01); C08K 2003/3045 (2013.01); C08K 2201/005 (2013.01)

(58) Field of Classification Search
CPC ..... B60R 21/2165; B32B 5/18; B32B 27/065; B32B 27/20; B32B 27/304; C08J 9/0066; C08J 9/04

See application file for complete search history.

(56) References Cited

U.S. PATENT DOCUMENTS

| 2,471,267 | A | 5/1949 | Millien et al. |
| 4,562,025 | A | 12/1985 | Ueno et al. |
| 5,580,083 | A | 12/1996 | Parker |
| 6,337,131 | B1 | 1/2002 | Rupaner et al. |
| 7,938,437 | B2 | 5/2011 | Lippert et al. |
| 8,328,972 | B2 | 12/2012 | Bracke |
| 10,640,071 | B2 | 5/2020 | Bussels et al. |

(Continued)

FOREIGN PATENT DOCUMENTS

| CN | 104448429 A | 3/2015 |
| DE | 102013224996 A1 | 6/2015 |

(Continued)

OTHER PUBLICATIONS

Matsumoto Yushi-Seiyaku Co., Ltd., Product data on Matsumoto Microspheres, 2008. [retrieved on Jan. 26, 2022]. Retrieved from the Internet: < URL:https://www.mtmtys.co.jp/e/product/general/data01_2.html>. (Year: 2008).*

(Continued)

Primary Examiner — Hai Vo (74) Attorney, Agent, or Firm — Lucas & Mercanti, LLP (57) ABSTRACT The present invention relates to a flexible molded skin as part of a composite structure for an airbag cover, and to a composition for producing such a skin using slush molding. The composition and flexible molded skin have a thermoplastic plasticized vinyl polymer, and a tear promoting agent selected from the group of one or more particulate blowing agents, inorganic mineral materials, organic filler materials and microspheres or a mixture of two or more of the afore mentioned materials. The particles of the particulate tear promoting agent have an average particle size of between 0.005 and 50 μm, preferably between 0.005 and 40 μm.

15 Claims, 1 Drawing Sheet

Related U.S. Application Data continuation-in-part of application No. PCT/EP2016/071698, filed on Sep. 14, 2016.

(51) Int. Cl.
  *B32B 27/40* (2006.01)
  *B29L 31/30* (2006.01)
  *B29K 27/06* (2006.01)
  *B29K 105/16* (2006.01)
  *B29K 509/00* (2006.01)

(56) References Cited

U.S. PATENT DOCUMENTS

| | | |
|---|---|---|
| 2002/0042235 A1 | 4/2002 | Ueno et al. |
| 2003/0047916 A1 | 3/2003 | Sun et al. |
| 2004/0054085 A1 | 3/2004 | Tansey |
| 2005/0037205 A1 | 2/2005 | Dalzotto et al. |
| 2009/0062454 A1 | 3/2009 | Hardouin-Duparc et al. |
| 2010/0261833 A1 | 10/2010 | Ghosh et al. |
| 2013/0049335 A1 | 2/2013 | Wisniewski et al. |
| 2013/0244017 A1 | 9/2013 | Tresino et al. |
| 2017/0101498 A1 | 4/2017 | Tsukada et al. |

FOREIGN PATENT DOCUMENTS

| | | |
|---|---|---|
| EP | 0590779 A1 | 4/1994 |
| EP | 3350255 A1 | 7/2018 |
| FR | 2120287 A5 | 8/1972 |
| FR | 2892124 A1 | 4/2007 |
| JP | H02191619 A | 7/1990 |
| JP | H04178449 A | 6/1992 |
| JP | 1995268160 A | 10/1995 |
| JP | 2002104125 A | 4/2002 |
| JP | 2004533362 A | 11/2004 |
| JP | 2009511729 A | 3/2009 |
| JP | 2012035741 A | 2/2012 |
| JP | 2015067738 A | 4/2015 |
| KR | 10-2008-0068071 A | 7/2008 |
| RU | 2478477 C2 | 4/2013 |
| WO | 2017046166 A1 | 3/2017 |

OTHER PUBLICATIONS

Office Action for corresponding Japanese Patent Application No. 2018-514901, dated Jun. 22, 2020 and English Translation (11 pages).

Office Action for corresponding Chinese Application No. 2019122402439700, dated Dec. 27, 2019.

Office Action for corresponding Russian Application No. 2018113253/05(020750), dated Jan. 14, 2020.

International Search Report and Written Opinion for International Application No. PCT/EP2016/071698. (10 Pages) (dated Oct. 27, 2016).

Wollastonite Product Data Overview Sheet, Fibertec Inc., 2019.

Office Action for corresponding Korean Patent Application No. 10-2018-7010576, dated Oct. 13, 2020 and English Translation (17 pages).

Office Action for corresponding Chinese patent application No. 201680053255.1, dated Sep. 11, 2020 and English Translation (19 pages).

Office Action for corresponding Canadian Patent Application No. 2,997,690, dated May 28, 2021 (3 pages).

Office Action for corresponding Mexican patent application No. MX/a2018/003117, dated Mar. 24, 2021 and English Translation (5 pages).

Office Action for corresponding Japanese patent application No. 2018-514901, dated Feb. 18, 2021 and English Translation (4 pages).

Office Action for corresponding Japanese patent application No. 2018-514901, dated Feb. 10, 2022 and English Translation (5 pages).

Notice of Opposition corresponding to European Patent No. 3350255 filed Feb. 7, 2022 (42 pages).

* cited by examiner

Fig. 1a  Fig. 1b

FLEXIBLE MOLDED SKIN

CROSS-REFERENCE TO RELATED APPLICATIONS

This application is a divisional of U.S. application Ser. No. 15/919,610 filed on Mar. 13, 2018, which is a Continuation-In-Part of PCT/EP2016/071698, filed Sep. 14, 2016, which claims the benefit of priority of European Application No. 15185072.4 filed on Sep. 14, 2015, the contents of each of which are incorporated herein by reference.

FIELD OF INVENTION

The present invention relates to flexible molded skin for an airbag cover, wherein the skin comprises at least one sheet of a plasticized thermoplastic vinyl polymer material having particles of a tear promoting agent dispersed therein, wherein the particles of a tear promoting agent have a melting temperature above the melting temperature of the vinyl polymer material.

BACKGROUND OF THE INVENTION

The use of vehicle trim panels, door panels, dashboards, instrument panels etc. with an integrated passenger airbag unit has become well established practice in car manufacturing industry. Structural integrity to the panel is provided by a rigid carrier. A layer of a compressible foam applied on top of the rigid carrier, usually in a thickness of 5-10 mm of a compressible foam, provides a soft tactile feel to the panel and levels uneven areas on the surface of the underlying carrier. The decorative and substantially non-structural skin applied on top of the foam layer usually has a thickness of 1-1.5 mm and is often made from a pliable polyvinyl chloride (PVC), a sprayable urethane elastomer material or a thermoplastic elastomer, thermoplastic olefin or thermoplastic polyurethane.

Polyvinyl chloride (PVC) skins are usually produced using slush molding. A box filled with a particulate PVC compound positioned beneath and locked to a heated mould part, supplies powder to the mould. The mould is repeatedly inverted to melt powder onto the hot mould surface and induce sintering of the particles. After the PVC particles have sintered together, a sheet of plasticized PVC is formed, the sheet or skin is cooled and removed from the mould. Slush molding of PVC compounds is for example disclosed in U.S. Pat. No. 4,562,025. An alternative to slush molding for producing PVC skins includes deep drawing of a flexible PVC foil or sheet into the desired shape.

Such skins when used in vehicle panels must however meet a number of stringent criteria, which relate a.o. to color stability and dimensional stability at high temperature and under prolonged UV exposure at elevated temperature, resistance to a wide variety of chemical compounds such as cleaning agents, human fluids, etc. A major challenge to be met by the decorative skin is that it must provide for a quick opening, to allow a quick and clean opening of the passenger airbag stored underneath the foam layer, through an opening provided in the rigid carrier underneath. To facilitate opening, the skin usually contains a weakening line or tear seam adapted to be torn or fractured by the force of the inflating air bag. In the course of time, the technique of producing such seams has undergone significant evolution, together with the changing design criteria and increasingly stringent safety specifications that are being imposed by car manufacturing industry. Whereas in the past the passenger airbag compartment cover was designed as a separate object that was positioned on top of the airbag compartment, modern car design has evolved towards instrument panels with a smooth, uninterrupted visible surface with built-in airbag compartment. To avoid that the tear seam would become visible in the course of time, the skin needs to possess a good resistance against ageing when exposed to heat and/or UV for long periods of time.

A known technique to produce a skin for a vehicle panel with an air bag tear seam is for example disclosed in U.S. Pat. No. 5,580,083. According to U.S. Pat. No. 5,580,083 a tear seam providing a local weakening in the skin is filled with a filler strip made of the same material as the cover or a thermoplastic material compatible therewith. The filler strip does however not thoroughly bond with the outer skin. Another known technique is disclosed by EP0590779, according to which the tear seam pattern is filled with a thermoplastic of lesser strength material to form an integrally bonded thermoplastic filler strip.

Modern design requirements that the airbag opening should be invisible and resist ageing need however be balanced by the safety criteria imposed by the industry, which require that the skin should allow for a quick and clean opening of the passenger airbag along the weakening line, within milliseconds to permit a fast deployment of the airbag. Another important safety criterion is that the skin-foam-carrier sandwich structure should break along the weakening line without particle shattering when the airbag bursts through the cover, at all operating conditions that might be encountered by the vehicle. Fragments released from the skin, foam or carrier, flying or being projected at high speed towards the passenger are to be kept minimal in all circumstances and should remain within certain limits. These safety criteria must be met by the instrument panel or any other type of airbag containing panel in a vehicle, across a wide temperature range, of at least between −35 and 80° C.

When designing instrument panels and materials for constructing such instrument panels it is a real challenge to provide an optimum compromise between on the one hand design criteria which impose that visibility of the airbag weakening line should be minimal also upon ageing, and airbag performance on the other hand to meet safety requirements and permit a quick and clean opening of the airbag. Evolution in the materials used for the production of the carrier and foam layer have not simplified this challenge, and it has been increasingly difficult to find acceptable compromises.

DE102013224996 discloses a flexible skin for an airbag cover, which comprises at least one layer of a plastic material, the layer of plastic material having particles of a further material incorporated therein and dispersed over the entire skin. The particles are made of a material with a higher melting point than the plastic material. The flexible skin is said to have an elongation at break of maximum 200% and a tensile strength of minimum 9 N/mm². The inventors have however observed that this combination of mechanical properties cannot be reproduced with the materials disclosed in DE102013224996 as can be understood from the comparative experiments represented below.

SUMMARY OF THE INVENTION

The present invention seeks to provide a flexible skin for an airbag cover which allows for a quick opening of the passenger airbag at minimum risk to the production of particles being projected towards the passenger and minimum risk to visibility of the airbag weakening line, even upon ageing, in the temperature range of between −35 and 80° C.

This is achieved according to the present invention with a flexible skin, which shows the technical features described herein.

The present invention relates to a flexible molded skin for an airbag cover, wherein the skin comprises at least one sheet of a plasticized thermoplastic vinyl polymer material having particles of a tear promoting agent dispersed therein, wherein the particles of the tear promoting agent have a melting temperature above the melting temperature of the vinyl polymer material, which is characterized in that the sheet of plasticized thermoplastic vinyl polymer material has an elongation at break of between 200.0% and 400.0% at room temperature measured according to ISO 527 part 1 and 2 test piece 5A, and a trouser tear strength of maximum 25 N/mm measured according to ISO 34-1 Method A.

It is within the scope of the present invention that the flexible molded skin for an airbag cover consists of a sheet of a plasticized thermoplastic vinyl polymer material having particles of a tear promoting agent dispersed therein.

In a preferred embodiment, the sheet of plasticized thermoplastic vinyl polymer material has an elongation at break of at least 215%, more preferably of at least 225%. In a preferred embodiment the molded skin has an elongation at break of maximum 375%, preferably maximum 350%, more preferably maximum 325%, most preferably maximum 300%, and in one particular aspect has a maximum 275%.

In a further preferred embodiment, the sheet of plasticized thermoplastic vinyl polymer material has a trouser tear strength of maximum 22.5 N/mm, preferably maximum 20 N/mm, more preferably maximum 18 N/mm, and in particular aspect has a maximum 17 N/mm. The trouser tear strength is preferably at least 5 N/mm, preferably at least 7.5 N/mm.

BRIEF DESCRIPTION OF THE DRAWINGS

The invention is further illustrated in the FIGURE below and description thereof.

The invention is further illustrated by the examples below.

DETAILED DESCRIPTION OF THE INVENTION

The sheet of plasticized thermoplastic vinyl polymer material of this invention has the particles of the tear promoting agent dispersed or distributed over the entire material of the sheet. As a result, the mechanical properties will be virtually the same over the entire sheet. In view of the small concentration of particles of tear promoting agent needed to achieve a desired effect, the risk that the tear promoting agent would adversely affect the mechanical properties required in the course of the normal use of the skin can be reduced to a minimum. These advantages are important in comparison to prior art skins, where the mechanical properties of the skin at the position of the weakening line in the underlying structure had to be substantially different from the mechanical properties of the remainder of the skin in order to provide the basis for opening of the airbag skin. Besides affecting the mechanical properties in prior art skins to an undesired extent, the weakening applied to prior art skins led to visibility of the weakening line upon ageing. The present invention has been found capable of overcoming this problem, also upon aging.

The inventors have observed that when the flexible skin of this invention is subjected to a local sudden force, which typically takes place upon opening of the airbag compartment and deployment of the airbag and which usually causes the skin to be stretched, stretching of the skin up to the point where the skin is torn may be limited to a desired extent. The inventors have further observed that the force needed to cause propagation of a tear or rupture once formed, may be reduced, thereby keeping airbag opening times, at a desired low level, or in other words keeping tear propagation rate at a desired high level. This is an advantage certainly at high temperatures, since the extent of any unwanted stretching or ballooning of the skin before rupture occurs and the risk to delamination of the skin from the underlying foam material, may be reduced to a minimum.

The effect of facilitated tear propagation has been observed irrespective of the temperature at which tearing is initiated. Thus, with the present invention propagation of a tear in the flexible skin or sheet of plasticized thermoplastic vinyl polymer material is facilitated once tearing has been initiated, without however causing an unwanted reduction of the tear strength of the flexible skin during normal use, i.e. where the airbag is not opened. Opening of the skin upon airbag deployment can be understood to be an elastic rupture as a result of the high tear propagation rate, with the plastic deformation of the flexible skin along the tear being reduced to a minimum.

The inventors have also observed that the amount of flying particles produced upon airbag deployment may significantly be reduced as compared to the prior art skins made by slush molding of PVC compounds, in particular at low temperatures of −35° C. It is assumed, without wanting to be bound by this assumption, that the observed facilitated propagation of a tear along the weakening line upon airbag deployment enhances the tear propagation rate to such an extent that no time is left for the skin to delaminate from the underlying foam. As a result, the risk to the formation of flying particles released from the skin may be reduced as well as the number of particles flying towards a passenger. This is advantageous, in particular with an H-shaped airbag opening where one part of the airbag opening opens towards the passenger, as therewith the risk to injuring car passengers may be significantly reduced. Also, the reduced risk to delamination from the underlying foam layer permits to limit the risk to further damaging of the car interior upon deployment of the airbag.

According to the inventors the effects described above can be explained by the fact that the sheet of plasticized thermoplastic vinyl polymer material has an elongation at break, and a trouser tear strength, which may be kept within desirable values.

The effects of (i) the reduced force needed to cause propagation of a tear or rupture, (ii) keeping tear propagation rate at a desired high level and facilitating tear propagation, (iii) as well as the reduction of flying particles produced upon airbag deployment, have been observed with flexible skins which contain a weakening line or tear seam as well as with flexible skins which do not contain such a weakening line. By the term tear seam, it is meant a local weakening line in the skin, usually on the face of the skin facing the airbag. A tear seam may for example be produced by a cutting line which extends through part of the thickness of the flexible skin.

In a still further preferred embodiment, the sheet of plasticized thermoplastic vinyl polymer material has a tensile strength of between 2 and 11 N/mm², preferably between 2 and 10 N/mm2, more preferably between 2 and 9 N/mm2, measured according to ISO 527 part 2 test piece 5A. It has been found that with a decreasing elongation at break, usually the tensile strength of the sheet and thus of the molded skin will decrease as well.

The present invention further shows the advantage that tensile strength of the flexible skin and the sheet of a plasticized thermoplastic vinyl polymer material may be tuned at a desired level as well as tensile elongation. The tensile strength is the maximum stress that a material can withstand while being stretched or pulled before failing or breaking. It is important that the tensile strength be limited to a sufficiently low value especially when the flexible skin or the sheet of a plasticized thermoplastic vinyl polymer material is subjected to high temperatures, such as for example 80° C. or more which is a temperature often encountered by car interior parts when exposed to sun. As a result of the reduced tensile strength, the risk to the occurrence of unwanted ballooning involving a substantial stretching of the skin or sheet and risk to delamination from the foam layer underneath, may significantly be reduced as well. This effect of the occurrence of a more brittle rupture is attributed to the fact that the flexible skin or sheet of a plasticized thermoplastic vinyl polymer material of this invention has a smaller tensile elongation at 80° C. In combination with the reduced force needed to propagate a rupture or tear, expulsion and deployment of the air bag is facilitated. Tensile strength and tensile elongation may be measured using the ISO 527 part 2 method, test piece 5A.

Without wanting to be bound by this theory, the inventors assume that the desirable tearing properties outlined above, in particular the reduced elongation at break at high temperature and desirable tensile strength and trouser tear strength at all temperatures, may be explained by the fact that in a plasticized thermoplastic vinyl polymer sheet produced using slush molding, the particles of the tear promoting agent are adsorbed on the external surface of the vinyl polymer particles. Where the surface is not covered by particles of the tear promoting agent, fusing or sintering of adjacent vinyl polymer particles may take place in the course of slush molding. At the positions where the surface of the vinyl polymer particles is covered by particles of the tear promoting agent, fusion or sintering of adjacent vinyl polymer particles is locally prohibited and adhesion between adjacent vinyl polymer particles is locally interrupted. The adhesion of adjacent or neighboring vinyl polymer particles achieved by slush molding of a composition of this invention may be understood to be comparable to a locally interrupted or perforated connection. Due to the presence of such interruptions, once broken, propagation of a breach in the adhesion or connection between adjacent particles is facilitated. On a macroscopic scale, the presence of the tear promoting agent in the composition of this invention facilitates opening by tearing apart of the flexible cover sheet in response to a sudden, instantaneous force tearing two opposite parts of the flexible cover sheet apart.

Within the scope of this invention, a wide variety of particulate materials may be used as a tear promoting agent. Materials suitable for use as a tear promoting agent include the particulate materials selected from the group of one or more particulate blowing agents, one or more particulate inorganic filler materials, one or more particulate organic filler materials and one or more particulate microspheres or a mixture of two or more of the afore mentioned particulate materials.

Depending on the nature of the particulate material of the tear promoting agent, the average particle size may be at least 0.005 μm, at least 0.01 μm or at least 0.05 μm. In a preferred embodiment, depending on the nature of the particulate material, the average particle size of the particulate material may be at most 50 μm, preferably at most 40 μm, in particular at most 30 μm, more in particular at most 25 μm, preferably at most 20 μm, more preferably at most 10 μm.

In general, the tear promoting agent will be present in the sheet of plasticized thermoplastic vinyl polymer material of this invention in a concentration between 0.1 and 7.50 wt. % with respect to the weight of the composition. In general, the optimal concentration of the tear promoting agent within this range, may vary with and depend on the nature of the tear promoting agent. The skilled person will be capable of selecting and adapting the appropriate concentration of the tear promoting agent, taking into account the nature of the material of the tear promoting agent, the aspect ratio of the particles of the tear promoting agent and the observed trouser tear strength and elongation at break. In practice, when use is made of particles of a tear promoting agent with a high aspect ratio for example an aspect ration higher than 5, a smaller amount of tear promoting agent may suffice to achieve the desired trouser tear strength and elongation at break, whereas using particles with a smaller aspect ratio for example smaller than 5, a larger concentration of tear promoting agent may be needed to achieve the desired trouser tear strength and elongation at break.

In general, the tear promoting agent will be present in a concentration which is at least 0.5 wt. % with respect to the weight of the sheet or composition, more preferably at least 0.75 wt. %, most preferably at least 1.0 wt. %, in particular at least 1.25 or 1.50 wt. %, more particularly at least 2.0 wt. % to achieve an optimum effect. Depending on the nature of the tear promoting agent, a minimum concentration often of at least 0.1 or 0.5 wt. % may be needed to permit achieving the desired effect of the tear promoting agent of a desired elongation at break and trouser tear strength.

The maximum concentration of the tear promoting agent will usually be less than 7.5 wt. %, preferably less than 5.0 wt. %, preferably less than 4.0 wt. %, more preferably less than 3.0 wt. %, in particular less than 2.75 wt. % with respect to the total weight of the vinyl polymer sheet or composition. With a too high concentration of the tear promoting agent, depending on the nature of the material, there is a risk to adversely affecting melting together of the vinyl polymer particles during slush molding, as well as a risk to hamper gelling during slush molding and the deposition of remainders of the tear promoting agent on the moulding device.

Organic as well as inorganic materials may be used as a tear promoting agent. Within the group of inorganic materials, a variety of inorganic mineral materials are suitable for use as tear promoting agent.

The particles of the tear promoting agent may have a variety of shapes, for example an elongated shape, they may be plate shaped, needle shaped, spherical, tetrahedral, an irregular shape, or a combination of two or more of the afore mentioned shapes. Preferably however the particles of the tear promoting agent have an elongated shape, or in other words the particles have an aspect ratio of the largest dimension of the particles of the tear promoting agent, with respect to the smallest dimension of the particles of at least 5. Such particles are called particles with a high aspect ratio. Advantageously, the use of particles with an elongated shape permits to keep the concentration of the tear promoting agent minimal. Preferably the aspect ratio of the largest dimension of the particles of the tear promoting agent, with respect to the smallest dimension of the particles is at least 5, preferably at least 10, more preferably at least 20, most preferably at least 25, in particularly at least 40, more particularly at least 50. The aspect ratio of the particles of the tear promoting agent will in general be smaller than 500.0, preferably smaller than 250.0 or 200.0, more preferably smaller than 150.0, most preferably smaller than 125.0 or smaller than 100.0.

With "aspect ratio" is meant a factor which responds to formula $$A_R = d_{max}/d_{min}$$

wherein $d_{min}$ corresponds to the smallest particle dimension and $d_{max}$ corresponds to the largest particle dimension. Particles having an aspect ratio equal to one usually correspond to particles which ideally have maximum symmetry, such as a sphere or cube. Particles having a shape factor larger than 1, may for example be substantially beam shaped or cylindrical, oval, needle shaped or any other elongated shape known to the skilled person. Plate shaped particles may suitably be used as well. In a particular embodiment, the use of a particulate tear promoting agent of needle shaped or plate shaped mineral materials may be preferred.

Particles with an elongated shape having a high aspect ratio which is higher than 5.0 as described above, will usually be present in the plasticized vinyl polymer sheet in an amount of at least 0.1 wt. %, more preferably at least 0.5 wt. %, most preferably at least 1.0 wt. %, in particular at least 1.5 wt. % or at least 2.0 wt. % and maximum 4.0 wt. %, preferably less than 3.0 wt. %, in particular less than 2.75 wt. % with respect to the total weight of the sheet or molded skin.

Examples of suitable plate shaped inorganic tear promoting agents, i.e. tear promoting agents with a high aspect ratio as described above, include one or more mineral materials selected from the group of silicates, aluminosilicates, magnesium silicates, carbonates such as magnesium aluminum carbonates, etc., in particular mica, talc, clay, vermiculite, wollastonite, zeolites in general, hydrotalcite, gypsum, or mixtures of two or more of the afore mentioned materials. Those materials will usually have a high aspect ratio as described above, often at least 25, in particularly at least 40, more particularly at least 50.

Depending on the nature of the tear promoting agent, however particles with a smaller aspect ratio of for example at least 1.0, at least 2.0 or at least 2.5 but generally less than 5 or less than 10, may be used as well. Inorganic materials with a smaller aspect ratio include titanium dioxide, chalk, calcium sulfate, barium sulfate and some zeolites. In order to achieve a desired effect, they are preferably present in the sheet of plasticized thermoplastic vinyl polymer material, in a concentration of at least 3.0 wt. %, preferably at least 4.0 wt. %, the preferred upper limit of 7.5 wt. % being similar as those described above.

Examples of organic tear promoting agents suitable for use with the present invention include polymers having a multi-layer structure, in particular a structure of the so-called core-shell type, which are made up of a core layer surrounded by at least one outer shell layer at least partly covering the core. Core shell materials are, for example, disclosed in JPH02191619, US2010261833, U.S. Pat. No. 6,337,131, the contents of each of which are incorporated herein by reference.

Contiguous layers of cores shell materials are composed of polymers of a different type. The core is usually in a soft rubber state, the shell portion on the surface is in a rigid state and a rubber per se in a powder (particle) state is an elastomer. In the core-shell rubber, most of the portions of the particle maintains an original form even after slush molding, for example, with a vinyl polymer. Suitable core-shell materials include those having a core containing a butadiene type rubber and a graft layer containing a polycarbonate (PC), a polybutylene terephthalate (PBT), a polyamide (PA), a polyethylene terephthalate (PET), a polystyrene (PS), a vinyl chloride polymer (PVC), an ABS polymer (ABS), and an acryl polymer (MMA); those having a core as described above and a graft layer further containing polypropylene (PP) and polyethylene (PE); those having a core containing a silicone-acryl blend rubber and a graft layer containing a polycarbonate (PC), a polybutylene terephthalate (PBT), a polyamide (PA), a polystyrene (PS), a vinyl chloride polymer (PVC). Core shell materials are for example commercially available from Mitsubishi Rayon as several kinds of METABLEN. These products are designed to offer maximum dispersability in various thermoplastics, their molecular weight may vary within wide ranges, they easily entangle with thermoplastic polymer molecules when heated, mainly because of physical interaction. These core shell materials usually have a smaller aspect ratio of up to 4 or 5, often about 1, and are preferably contained in the sheet of plasticized thermoplastic vinyl polymer material of the present invention in a concentration of at least 0.1 wt. %, more preferably at least 0.5 wt. %, most preferably at least 1.0 wt. %, in particular at least 1.5 wt. % or at least 2.0 wt. %, whereas the maximum concentration may be 7.5 wt. %, preferably maximum 4.0 wt. %, preferably less than 3.0 wt. %, in particular less than 2.75 wt. % with respect to the total weight of the sheet or molded skin, as described above.

According to another preferred embodiment, the tear promoting agent comprises expandable microspheres, having a shell of either glass or an expandable thermoplastic material with a blowing agent contained in the interior of the shell as a distinct and separate phase. Such an expandable microsphere is a material that can act as a blowing agent when mixed in a product and subsequently heated to cause expansion within the matrix. The particles usually have a generally spherical shape and have encapsulated therein, a distinct and separate liquid phase consisting essentially of a volatile organic liquid raising agent, the liquid becoming gaseous at a temperature below the thermoplastic or softening temperature of the particle. The particle is generally impermeable to the raising agent. Heating causes heat plasticization of the polymer shell and volatilization of the raising agent thereby expanding the particle to form a monocellular hollow generally spherical shell having a gaseous center. Expandable microspheres are for example disclosed in U.S. Pat. No. 3,615,972. When used in the composition of the present invention, expansion is expected to take place during slush molding.

Commercially available expandable microspheres are well known to the skilled person as expandable off-white microspheres, often 6 to 300 micrometers in average diameter and a density of 900 to 1400 kg/m³. The expandable microspheres are used as a blowing agent in products like injection molding of thermoplastics. In order to achieve the desired effect, the expandable microspheres are mixed with the vinyl polymer in a desired amount, and then the blend is subjected to slush molding to produce the sheet of plasticized thermoplastic vinyl polymer material. The product acts as a light weight filler in many products.

The shell may be made of a variety of polymeric materials, polymers made of alkenyl aromatic monomers being preferred. Examples of such alkenyl aromatic monomers include styrene, o-methylstyrene, m-methylstyrene, p-methyl-styrene, ethylstyrene, ar-vinyl-xylene, ar-chlorostyrene, or ar-bromostyrene. Various other styrene derived compounds may be employed such as vinylbenzyl chloride, p-tert.-butylstyrene, and the like. Typical acrylate materials which may be used are methyl methacrylate, ethyl acrylate, propyl acrylate, butyl acrylate, butyl methacrylate, propyl methacrylate, butyl methacrylate, lauryl acrylate, 2-ethylhexylacrylate, ethyl methacrylate, and the like. Copolymers of vinyl chloride and vinylidene chloride, acrylonitrile with vinyl chloride, vinyl bromide, and similar halogenated vinyl compounds may be used as well. As blowing agents usually volatile fluid-forming agents will be used such as aliphatic hydrocarbons including ethane, ethylene, propane, propene, butene, isobutene, neopentane, acetylene, hexane, heptane, or mixtures of one or more such aliphatic hydrocarbons having a boiling point below the range of the softening point of the polymerous material when saturated with the particular blowing agent utilized.

The presence of expandable microspheres permits to reduce the weight of the flexible skin and provide it with a very fine and extremely uniform cell structure. Product enhancements induced by their presence include density reduction, improved dimensional stability, better thermal insulation, and cost saving.

Expandable microspheres are commercially available from Asia Pacific Microspheres Sdn Bhd (APM; Selangor Darul Ehsan, Malaysia) and Expancel Inc. APM produces phenolic and amino-based spheres, filled with ammonium carbonate blowing agent. Expancel consists of a thin thermoplastic shell (a copolymer, such as vinylidene chloride, acrylonitrile or methyl methacrylate) that encapsulates a hydrocarbon blowing agent (typically isobutene or isopentane). When heated, the polymeric shell gradually softens, and the liquid hydrocarbon begins to gasify and expand. The particle size for expanded microspheres ranges from 20-150 µm, depending on the grade. When fully expanded, the volume of the microspheres increases more than 40 times. Microspheres deform when the polymer is pressurized prior to spraying, but once the material returns to ambient pressure, the microspheres will rebound to their spherical shape.

Typical loadings of the expandable microspheres are at least 0.05 wt. %, preferably at least 0.1 wt. %, more preferably at least 0.15 wt. %, most preferably at least 0.30 wt. %, and maximum 7.5 wt. % or maximum 5.0 wt. %, preferably maximum 4.0 wt. % or 3.0 wt. %, more preferably maximum 2.0 wt. % with respect to the weight of the sheet of plasticized thermoplastic vinyl polymer material or the molded skin in case the skin exclusively consists of the sheet of plasticized thermoplastic vinyl polymer material.

According to a further preferred embodiment, the tear promoting agent may comprise at least one blowing agent. Suitable blowing agents are well known to the skilled person, they include physical as well as chemical blowing agents. Examples of suitable blowing agents include chemical additives capable of producing gas through thermal decomposition of the particulate material. Blowing agents may be of organic or inorganic nature. Examples of suitable blowing agents include azodicarbonamides commercially known as Porofor® available from Lanxess, Ficel®, diazenedicarboxamide, OBSH, TSH, BSH available from Marubeni Europe, Tracel and Unicell available from Tramaco, but other blowing agents considered suitable by the skilled person may be used as well.

Typical loadings of the blowing agent are at least 0.05 by weight, preferably at least 0.1 wt. %, more preferably at least 0.15 wt. %, most preferably at least 0.30 wt. %, and maximum 7.5 wt. % or maximum 5.0 wt. %, preferably maximum 4.0 wt. % or 3.0 wt. %, more preferably maximum 2.0 wt. % with respect to the weight of the sheet of plasticized thermoplastic vinyl polymer material or the molded skin in case the skin exclusively consists of the sheet of plasticized thermoplastic vinyl polymer material.

The incorporation of the microspheres or blowing agent described above, presents the advantage that the density of the flexible skin or sheet of plasticized vinyl polymer material may be reduced, and therewith the weight of the flexible skin and the laminate incorporating it.

It is within the scope of this invention that a mixture of two or more types of the above described tear promoting agents may be used as a tear promoting agent in the flexible molded skin of this invention.

Within the scope of this invention a wide variety of vinyl polymers and blends thereof with other polymers may be used to produce the sheet of plasticized thermoplastic vinyl polymer material and the flexible molded skin containing or consisting of that sheet. In particular, the vinyl polymer may be used as such or the vinyl polymer may be used in a mixture of polyvinyl chloride (PVC) and a compatible polymer chosen from copolymers or terpolymers of vinyl chloride and vinyl acetate (VC/VA) or vinyl chloride and an acrylic derivative (VC/AD) for example lower alkyl acrylates or methacrylates, acrylic and methacrylic acid, thermoplastic polyurethanes (TPUs), thermoplastic polyetheresters, ethylene/vinyl monomer (EVA) copolymers, ethylene/vinyl monomer/carbonyl terpolymers, melt-processable acrylic elastomers, copolymers with polyamide blocks and polyether blocks or polyether-block-amides, chlorinated or chlorosulfonated polyethylenes, functionalized or unfunctionalized ethylene/alkyl (meth)acrylate or (meth)acrylic acid polymers, MBS core-shell polymers, SBM block terpolymers, PVDF and powdered polyamide polymers.

The vinyl polymer is preferably polyvinyl chloride (PVC), more preferably PVC obtained by a suspension or micro suspension process, but PVC manufactured in emulsion or in bulk may also be used. Preferred PVC polymers are those with a K-value between 50 and 80, often between 65 and 80. The K value is an empirical parameter closely related to intrinsic viscosity, often used to express a viscosity based estimate of the statistical molecular mass of polyvinylchloride. The most commonly used K value in Europe is the Fikentscher K value (referenced in DIN EN ISO 1628-1) obtained by dilute solution viscometry and solving Fikentscher equation.

Particularly preferred vinyl polymer particles have an average particle size of between 25.0 µm and 300.0 µm, more preferably between 50.0 µm and 300.0 µm. The average particle size of the vinyl polymer particles will usually be at least 25.0 µm, more preferably at least 50.0 µm, most preferably at least 75.0 µm, in particular at least 100.0 µm. The average particle size of the vinyl polymer particles will usually be below 400.0 µm, preferably maximum 350.0 µm, more preferably maximum 300.0 µm, and most preferably maximum 250.0 µm.

The amount of the vinyl polymer or vinyl polymer blend present in the sheet of plasticized thermoplastic vinyl polymer material or the flexible molded skin of this invention may vary within wide ranges, but will usually be between 40.0 and 60.0 wt. % with respect to the total weight of the sheet. Likewise a composition for producing the flexible skin of this invention will generally contain between 40.0 and 60.0 wt. % with respect to the total weight of the composition of a vinyl polymer material.

The sheet of plasticized thermoplastic vinyl polymer material or the flexible molded skin of this invention may further comprise from 30 to 50 wt. % with respect to the weight of the sheet of a plasticizer composition comprising one or more types of plasticizers, which will usually be those well known to the skilled person. In a preferred embodiment, the amount of plasticizer varies from 37.0-47.0 wt. %, preferably from 37.0-45.0 wt. % with respect to the weight of the sheet. Increasing the amount of plasticizer in the polymer composition beyond the top of these ranges would not only adversely affect processability of the composition, but would also increase the elongation at break to undesirable values, so that the rupture or tearing of the flexible skin will rather be a viscous rupture associated with plastic material deformation along the rupture, in stead of the desired elastic rupture associated with fast tear propagation.

Within the scope of the present invention, a wide variety of plasticizers may be used.

Suitable plasticizers include monomeric esters of typically $C_8$ to $C_{13}$ alcohols and organic acids which may be saturated or unsaturated, and may either be mono- or polycarboxylic organic acids. Examples of organic acids suitable for use in the plasticizer of this invention include esters of trimellitic acid (for example, octyl trimellitate—TMO), sebacic acid (for example dioctyl sebacate—DOS, diisodecyl sebacate—DIDS), azeleic acid (for example dioctyl azelate—DOZ), adipic acid (for example dioctyl adipate—DOA, diisodecyl adipate—DIDA, ditridecyl adipate (DTDA), phthalic acid (for example, dibutyl phthalate—DBP, dioctyl phthalate—DOP, diundecyl phthalate—DUP, ditridecyl phthalate—DTDP), citric acid, benzoic acid, glutaric acid, fumaric acid, maleic acid, oleic acid (for example butyl oleate), palmitic acid and azelaic acid and mixtures of two or more hereof. Esters of phosphoric acid may also be used. The skilled person will be capable of selecting the appropriate plasticizer taking into account the temperature at which the composition is to be processed and the volatility of the plasticizer. Preferred are those plasticizers which have a high molecular weight, preferably at least 300, more preferably at least 350.

Examples of alcohols suitable for use in such monomeric plasticizers, can be linear or branched C8 to C14 alcohols. In a preferred embodiment use is made of a C9 fatty alcohol or diol, comprising at least 60 wt. %, or at least 80 wt. %, but maximum 95 wt. % % straight-chain alcohols. The concentration of branched C9 alcohols may be maximum 40 wt. %, preferably between 5 and 40 wt. %. The alcohol may contain at least 15 wt. % of branched nonyl alcohols having branching at the 2-carbon position.

The aforementioned plasticizers may be used in combination with at least one polymeric plasticizer. It is however preferred that the content of the polymeric plasticizer is at least 10.0 wt % relative to the total amount of plasticizer present.

Suitable polymeric plasticizers include those obtained from the condensation of a dicarboxylic acid, a tricarboxylic acid or a polycarboxylic acid or a mixture of two or more of the aforementioned carboxylic acids, with a diol or of a mixture of various carboxylic diacids with one or more diols. Suitable dicarboxylic acids for the preparation of such polymeric plasticizers include phthalic acid, terephtalic acid, adipic acid, sebacic acid, succinic acid, citric acid, trimellitic acid etc. Other suitable polycarboxylic acids include alicyclic carboxylic acids selected from the group of aromatic tricarboxylic acids and their derivatives, in particular 1,2-cyclohexanedicarboxylic acid, 1,4-cyclohexanedicarboxylic acid, 4-cyclohexene-1,2-dicarboxylic acid or derivatives thereof. Examples of diols suitable for use in such polymeric plasticizers include for instance ethylene glycol, propylene glycol, butanediol, hexanediol Polymeric plasticizers produced from the afore-mentioned components are preferred for their reduced volatility, better resistance to environmental damage and superior response to temperature extremes in use, when compared to monomeric plasticizers. Other suitable polymeric plasticizers for use with-the present invention include, in particular a polyphthalate or a polyadipate.

In a preferred embodiment use is made of a plasticizer composition which is substantially free of phthalic acid esters.

The use of the above-mentioned polymeric plasticizers is preferred for their ability of suppressing the migration of the plasticizers between the PVC skin layer and the foam layer underneath, especially during ageing under the influence of long time exposure of the skin to heat and/or UV radiation. This is advantageous since the risk to the occurrence of skin volume reduction and skin tensioning, which risks to induce unwanted visibility of a possible airbag tearing line applied to the face of the skin facing the airbag compartment, as a thin depression line upon ageing of the flexible skin, may be overcome.

The flexible skin of this invention or the sheet of plasticized vinyl polymer material will usually contain from 40.0 to 60.0 wt. % of one or more vinyl polymers, in particular PVC resins with a K-value between 50 and 80; from 30.0 to 50.0 wt. %% of one or more types of plasticizers, of which at least one is of polymeric nature, or is a heavy monomeric plasticizer; and from 1.0 to 20.0 wt. % of additives, such as pigments or fillers, stabilizers, antioxidants, processing aids and lubricants and from 0.1 to 7.5 wt. % of one ore more tear promoting agents.

The present invention also relates to a process for producing a flexible molded skin as described above, wherein a mixture is produced comprising particles of a thermoplastic vinyl polymer material, particles of a tear promoting agent and at least one plasticizer, wherein the mixture is supplied to a mold of a slush molding device, wherein the mold is heated to a temperature of between 200 and 250° C. and the mixture is subjected to slush molding to plasticize the vinyl polymer and produce a flexible skin, after which the flexible skin is removed from the mold and left to cool. Slush molding is a technique with which flexible sheets of particulate PVC compound may be molded in a certain shape, and is generally known to the skilled person. A method and device for slush molding of PVC compounds is for example disclosed in U.S. Pat. No. 4,562,025. In slush molding, a powder box containing the particulate PVC compound as described above is positioned beneath and locked to a heated mould part, and supplies powder to the mould. The mould is repeatedly inverted to melt powder onto the mould surface and induce sintering of the particles. After the PVC particles have sintered together at elevated temperature to form the part, the part is cooled and removed from the mould.

The present invention also relates to the use of a particulate material selected from the group of one or more particulate blowing agents, inorganic mineral materials, organic filler materials and microspheres or a mixture of two or more of the afore mentioned materials as described above, wherein the particles of the afore-mentioned particulate materials have an average particle size of between 0.005 and 50 μm, preferably between 0.005 and 40 μm, as a tear promoting agent for producing a flexible molded skin comprising at least one sheet of a plasticized vinyl polymer for a composite skin structure as described above, or a laminate as described below, wherein the flexible sheet has an elongation at break of between 200 and 400% and a trouser tear of maximum 25 N/mm.

The present invention also relates to the use of a particulate material as described above, as a tear promoting agent in a composition comprising at least one thermoplastic vinyl polymer, for producing a flexible sheet of a composite skin structure. Preferred particulate materials are those selected from the group of inorganic mineral materials and organic filler materials or a mixture of two or more hereof. Examples of suitable organic tear promoting agents include expandable microspheres with a blowing agent contained in the interior of the shell or so-called core-shell materials, one or more blowing agents, or a mixture of two or more of the afore mentioned materials. Examples of suitable inorganic tear promoting agents are those described above, or mixtures of two or more thereof. The particles of the afore-mentioned particulate materials will usually have an average particle size of between 0.005 and 50 μm, preferably between 0.005 and 40 μm.

The present invention also relates to a composition for producing a flexible molded skin or a sheet of a plasticized vinyl polymer material as described above, wherein the composition comprises 30.0 to 50.0 wt. % of a plasticizer as described above and 0.1 to 7.5 wt. % of particles of a tear promoting agent as described above, the remainder to 100 wt. % comprising usually 40.0-60.0 wt. % of one or more vinyl polymers as described above, and 1.0-20.0 wt. % of the usual additives. The composition of this invention is meant for use in slush molding of flexible sheets, and will in general comprise particles of a polymer, in particular a vinyl polymer or a blend thereof with a further polymer as described above, one or more plasticizers as described above, and usually from 1 to 20 wt. %, preferably 3-10 wt. % of the usual additives, such as pigments, fillers, stabilizers, flame retardants, UV-absorbers, antioxidants, release agents, processing aids and lubricants.

The present invention also relates to a laminate, comprising a rigid carrier with at least one opening for receiving at least one airbag, wherein to at least part of one side of the rigid carrier a layer of a polymer foam is adhered, and wherein at least part of a side of the polymer foam layer opposite the side facing the carrier is adhered to a flexible skin as described above produced by slush molding of a composition as described above. The flexible skin will usually take the form of a continuous sheet, covering the surface of the flexible foam. The laminate of the present invention shows the advantage that an inflating airbag causes a quick tearing of the flexible skin along the tear seam, at minimal risk to delamination of the cover sheet from the underlying polymer foam. This is an important advantage as it permits minimizing the risk to the formation of loose particles being projected to the passengers.

The air bag weakening line contained in the laminate of this invention may take any shape considered suitable by the skilled person, for example a U-shape, H-shape or double Y-shape, but other shapes may be used as well. The laminate of this invention is particularly suitable for use with H-shaped air bag openings, wherein one door is provided to move towards the passenger upon airbag inflation, and the other door is provided to move towards the vehicle window.

The layer thickness of the materials composing the laminate of this invention, may be those frequently used in the art. For example, the laminate of the present invention may comprise a layer of a polymer foam having a thickness between 0.5 and 10 mm, preferably between 0.9 and 8 mm.

a flexible sheet preferably made of a vinyl polymer, more preferably a polyvinylchloride layer produced by slush molding of the above described composition, having a thickness between 0.5 and 2 mm, preferably between 0.7 and 1.5 mm.

From the description given above it may be concluded that the present invention, in particular the use of a particulate tear promoting agent in a composition for producing a flexible sheet of a vinyl polymer, provides a solution to a long living compromise in the art between minimizing visibility of a weakening or tearing line applied to the flexible sheet and still permit a sufficiently fast opening of the airbag at low temperature (for example −35° C.) at minimum risk the formation of flying particles, as well as a minimum risk to ballooning and the formation of flying particles at higher temperatures (for example 80° C.).

EXAMPLES 1-4

A composition was prepared for producing a flexible cover sheet, by blending 100 parts by weight of a polyvinylchloride polymer having a K value of between 65 and 70 and an average particle size of 100-200 μm, varying amounts of talc as indicated in the table below. Use was made of a talc having an average particle size of 8.2 μm and a surface area of 5 $m^2/g$ and the usual additives, stabilizer, filler, processing aid and lubricant.

The composition was subjected to slush molding, as follows:

the mould was heated to temperature between 200 and 250° C.

the powder box was attached to the mold the powder box and mold were turned clockwise and counterclockwise twice.

The mold was rotated 180° and unclamped from the powder box

The flexible skin thus produced was actively cooled to room temperature and removed from the mold The tensile strength and elongation at break were measured according to ISO 527-2 test piece 5A, the tear resistance was measured according to ISO 34-1 method B, procedure B, and the flexible sheets were subjected to a manual tear test. The results are summarized in table 1 below.

TABLE 1

| Ex. | Amount of talc (wt. %) | Tensile strength (MPa) | Elongation at break (%) | Tear resistance (N/mm) | Trouser tear strength (N/mm) | Manual tear test |
|---|---|---|---|---|---|---|
| 1 | 0% | 12.6 | 320 | 35 | 30.8 | Ductile |
| 2 | 0.75 wt. % | 11.6 | 294 | 36.7 | 32.0 | Ductile |
| 3 | 1.50 wt. % | 10.3 | 261 | 40.1 | 27.6 | Brittle |
| 4 | 2.00 wt. % | 9.8 | 242 | | 24.65 | Brittle |
| 4 | 2.25 wt. % | 9.2 | 228 | 33.3 | 23.8 | Brittle |

Figure 1A:
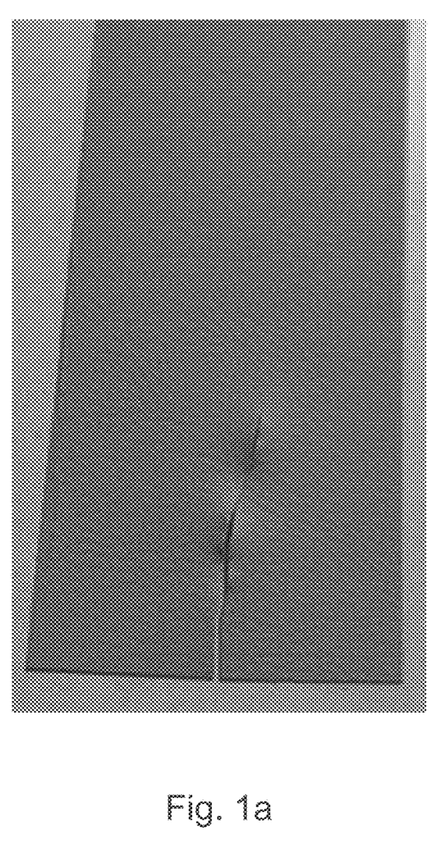
FIG. 1*a* shows a flexible PVC sheet obtained by slush molding of a known composition, and subjected to fast tearing.
Figure 1B:
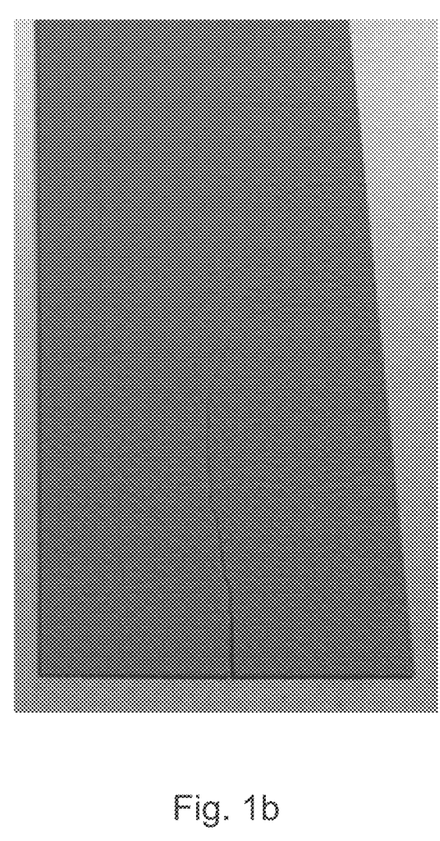
FIG. 1*b* shows a flexible PVC sheet obtained by slush molding of a composition according to the invention, and subjected to fast tearing.

From the measurements summarized in the table above, it appears that the presence of a minimum amount of talc gives rise to a reduction of the trouser tear strength, and causes the elongation at break to decrease. The tear resistance, representative for the strength of the material was however not reduced and was not adversely affected by the presence of the tear promoting agent. Furthermore, from the enclosed pictures and the manual tear test it can be observed that the presence of a minimum amount of talc (FIG. 1b) gives rise to a more brittle tearing behavior, and a facilitated opening of the material. Whereas in the absence of talc, as can be seen from FIG. 1a, a more ductile tearing behavior was observed with plastic deformation of the material along the tearing line.

EXAMPLES 5-6

Examples 1-4 were repeated this time using 2.0 wt. % of the following types of tear promoting agents:
Metablen is a core shell material which is commercially available from Mitsubishi Rayon,
Paraloid is a core shell material comprising an acrylic polymer available from DOW Chemical.
The tensile strength, elongation at break and trouser tear strength were measured as described above. The results are given in table 2.

TABLE 2

| Example | | Tensile strength (MPA) | Elongation at break (%) | Trouser tear strength (N/mm) |
|---|---|---|---|---|
| 5 | Paraloid | 6.7 | 227 | 13.9 |
| 6 | Metablen | 6.7 | 209 | 11.7 |

From the examples 5 and 6 it can be seen that incorporation of an amount of a tear promoting agent according to the invention permits to obtain flexible PVC skins with a reduced tensile strength, elongation at break and trouser tear strength in comparison to the reference example 1. The reduced trouser tear strength indicates that once tearing has been initiated, tear propagation proceeds at a higher rate in comparison to reference sample 1 when the skin is subjected to a certain tear force, and requires a smaller force to proceed according to a certain tear propagation rate.

Because of the reduced elongation at break, certainly when subjected to high temperature, the risk to ballooning of the skin may be reduced. This is important as it may be associated with delamination of the flexible skin from the underlying foam structure and particles being projected into the vehicle space.

EXAMPLES 7-11

Example 6 was repeated using the indicated amounts of Metablen as a core shell material. Metablen is commercially available from Mitsubishi Rayon, Expancel are expandable microspheres.
The results are given in table 3.

TABLE 3

| Ex. | Amount of metablen (wt. %) | Tensile strength (MPa) | Elongation at break (%) | Trouser tear strength (N/mm) |
|---|---|---|---|---|
| 7 | 0 | 13.9 | 347 | 29.4 |
| 8 | 0.80 | 11.5 | 272 | 27.9 |
| 9 | 1.60 | 10.6 | 247 | 23.2 |
| 10 | 2.40 | 9.2 | 210 | 24.9 |
| 11 | 3.10 | 9.2 | 205 | 23.4 |

EXAMPLES 12-15

Example 6 was repeated using the indicated amounts of Metablen and Expancel. Metablen is a core shell material commercially available from Mitsubishi Rayon, Expancel. The results are given in table 4.

TABLE 4

| Ex. | Amount of metablen (wt. %) | Amount of Expancel (wt. %) | Tensile strength (MPa) | Elongation at break (%) | Trouser tear strength (N/mm) |
|---|---|---|---|---|---|
| 7 | 0 | 0.3 | 4.5 | 213 | 17.0 |
| 8 | 0.70 | 0.3 | 4.1 | 203 | 12.5 |
| 9 | 1.40 | 0.3 | 4.8 | 205 | 13.6 |
| 10 | 2.10 | 0.3 | 4.4 | 202 | 15.2 |

Comparative Experiments

Examples 1-4 were repeated this time using cloisite in various concentrations as tear promoting agent. The results are given in table 5.

TABLE 5

| Comparative experiment | Tear promoting agent | Tear promoting agent (wt. %) | Tensile strength (MPA) | Elongation at break (%) |
|---|---|---|---|---|
| A | | 0 wt. % | 13.43 | 343.53 |
| B | Cloisite 10A | 1.0 wt. % | 4.56 | 78.42 |
| C | | 2 wt. % | 3.92 | 57.48 |
| D | | 5 wt. % | 3.30 | 43.50 |
| E | Cloisite 15 | 1.0 wt. % | 6.42 | 152.67 |
| F | | 2.0 wt. % | 4.21 | 76.03 |
| G | | 5.0 wt. % | 3.41 | 44.00 |
| H | Cloisite 20 | 1.0 wt. % | 5.49 | 113.45 |
| I | | 2.0 wt. % | 3.92 | 61.16 |
| J | | 5.0 wt. % | 2.97 | 42.03 |

The invention claimed is:
1. A flexible molded skin for an airbag cover, wherein the skin comprises a sheet of a plasticized thermoplastic vinyl polymer material having particles of a tear promoting agent dispersed therein,
wherein the amount of vinyl polymer is 40 to 60 wt % with respect to the total weight of the sheet,
wherein the amount of plasticizer is 30 to 50 wt % with respect to the total weight of the sheet,
wherein the particles of the tear promoting agent have a melting temperature above the melting temperature of the vinyl polymer material,
wherein the particles of tear promoting agent are adsorbed on the external surface of the vinyl polymer particles, and
wherein the tear promoting agent is an expandable polymeric microsphere of 6 to 300 micrometers in average diameter and a density of 900 to 1400 kg/m$^3$, wherein said tear promoting agent is mixed with the vinyl polymer and then subjected to slush molding to produce the sheet of plasticized thermoplastic vinyl polymer material, said tear promoting agent being contained in the sheet of plasticized thermoplastic vinyl polymer material in an amount of from 0.05 wt % to 7.5 wt % such that the sheet of plasticized thermoplastic vinyl polymer material has an elongation at break of between 200.0% and 400.0% at room temperature measured according to ISO 527 part 1 and 2 test piece 5A, and a trouser tear strength of 25 N/mm or less measured according to ISO 34-1 Method A.

2. A flexible molded skin as claimed in claim 1, wherein the sheet of plasticized thermoplastic vinyl polymer material has an elongation at break from 215% to 400%.

3. A flexible molded skin as claimed in claim 1, wherein the sheet of plasticized thermoplastic vinyl polymer material has an elongation at break of maximum 375%.

4. A flexible molded skin as claimed in claim 1, wherein the sheet of plasticized thermoplastic vinyl polymer material has a trouser tear strength of maximum 22.5 N/mm.

5. A flexible molded skin as claimed in claim 1, wherein the sheet of plasticized thermoplastic vinyl polymer material has a trouser tear strength of from 5 N/mm to 25 N/mm.

6. A flexible molded skin as claimed in claim 5, wherein the sheet of plasticized thermoplastic vinyl polymer material has a trouser tear strength of from 7.5 N/mm to 25 N/mm.

7. A flexible molded skin as claimed in claim 1, wherein the sheet of plasticized thermoplastic vinyl polymer material has a tensile strength from 2 to 11 N/mm$^2$, measured according to ISO 527 part 2 test piece 5A.

8. A flexible molded skin as claimed in claim 1, wherein the sheet of plasticized thermoplastic vinyl polymer material contains from 0.5 wt % to 5.0 wt % of the particles of tear promoting agent with respect to the weight of the sheet.

9. A flexible molded skin as claimed in claim 8, wherein the sheet of plasticized thermoplastic vinyl polymer material contains from 1.0 wt % to 4.0 wt % of the particles of tear promoting agent with respect to the weight of the sheet.

10. A flexible molded skin as claimed in claim 1, wherein the tear promoting agent has a shell of an expandable thermoplastic material filled with a blowing agent and an aspect ratio of maximum 5.0.

11. A flexible molded skin as claimed in claim 1, wherein the plasticized vinyl polymer comprises polyvinylchloride, optionally having a K value of at least 50 and a maximum of 80.

12. A flexible molded skin as claimed in claim 1, wherein sheet of plasticized thermoplastic vinyl polymer material contains from 30-50 wt. %, of at least one plasticizer composition.

13. A flexible molded skin as claimed in claim 12, wherein the plasticizer composition comprises a monomeric compound selected from the group consisting of azelates, trimellitates, sebacates, adipates, phthalates, citrates, benzoates, tallates, glutarates, fumarates, maleates, oleates, palmitates and acetates.

14. A flexible molded skin as claimed claim 1, comprising a weakening line which extends through part of a thickness of the skin.

15. A laminate, comprising a rigid carrier comprising an opening for receiving at least one airbag, wherein to at least part of one side of the rigid carrier a layer of a polymer foam is adhered, and wherein at least part of a side of the polymer foam layer opposite the side facing the carrier, is adhered to a flexible molded skin as claimed in claim 1.

* * * * *